US010779266B2

(12) United States Patent
Chen et al.

(10) Patent No.: US 10,779,266 B2
(45) Date of Patent: Sep. 15, 2020

(54) ENHANCED SRS TRANSMISSION FOR MIMO OPERATION IN LTE-A

(71) Applicant: QUALCOMM Incorporated, San Diego, CA (US)

(72) Inventors: Wanshi Chen, San Diego, CA (US); Peter Gaal, San Diego, CA (US); Hao Xu, San Diego, CA (US); Yongbin Wei, San Diego, CA (US); Stefan Geirhofer, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 391 days.

(21) Appl. No.: 15/422,185

(22) Filed: Feb. 1, 2017

(65) Prior Publication Data
US 2017/0150482 A1 May 25, 2017

Related U.S. Application Data

(62) Division of application No. 13/773,316, filed on Feb. 21, 2013, now Pat. No. 9,596,065.
(Continued)

(51) Int. Cl.
*H04W 72/04* (2009.01)
*H04B 7/0456* (2017.01)
(Continued)

(52) U.S. Cl.
CPC .......... *H04W 72/042* (2013.01); *H04B 7/046* (2013.01); *H04B 7/0413* (2013.01);
(Continued)

(58) Field of Classification Search
CPC ...... H04W 72/042; H04L 5/14; H04L 5/0051; H04L 5/0073; H04L 25/0206;
(Continued)

(56) References Cited

U.S. PATENT DOCUMENTS 8,553,795 B2  10/2013 Xu et al.
8,792,930 B1   7/2014 Gopalakrishnan et al.
(Continued)

FOREIGN PATENT DOCUMENTS

EP      2023504 A2    2/2009
KR  20100082754 A     7/2010
(Continued)

OTHER PUBLICATIONS

Ericsson, et al., "On the details of dynamic aperiodic SRS", 3GPP Draft; R1-104853, 3rd Generation Partnership Project (3GPP), Moblie Competence Centre; 650, Route Des Lucioles; F-06921 Sophia-Antipolis Cedex; France vol. RAN WG1, No. Madrid, Spain; Aug. 23, 2010, Aug. 17, 2010 (Aug. 17, 2010), pp. 1-6, XP050450027, [retrieved on Aug. 17, 2010].
(Continued)

*Primary Examiner* — Walter J Divito
(74) *Attorney, Agent, or Firm* — Norton Rose Fulbright LLP

(57) ABSTRACT

Enhanced sounding reference signal (SRS) transmissions for multiple input, multiple output (MIMO) operation are disclosed in which a user equipment (UE) detects an observed interference level for each receiver chain of the UE. In response to an imbalance, the UE precodes a SRS targeting downlink operation to indicate the imbalance. The UE then transmits the precoded SRS. In alternative aspects, the precoded SRS vector may be determined by an evolved nodeB (eNB). In such aspects, the eNB determines the precoded SRS vector targeting downlink operations for the served UEs, wherein the determined precoded SRS vector includes determining the precoded SRS vector on a per UE basis, enabling the precoded SRS vector for either one or both of frequency division duplex (FDD) systems and time division duplex (TDD) systems, or enabling the precoded
(Continued)

SRS vector for aperiodic SRS only. The eNB then transmits the determined precoded SRS vector to the UE.

23 Claims, 8 Drawing Sheets

Related U.S. Application Data

(60) Provisional application No. 61/718,119, filed on Oct. 24, 2012.

(51) Int. Cl.

| | | |
|---|---|---|
| *H04B 7/06* | (2006.01) | |
| *H04J 11/00* | (2006.01) | |
| *H04L 25/02* | (2006.01) | |
| *H04L 5/00* | (2006.01) | |
| *H04B 7/0413* | (2017.01) | |
| *H04L 5/14* | (2006.01) | |
| *H04B 7/08* | (2006.01) | |

(52) U.S. Cl.
CPC ......... *H04B 7/0615* (2013.01); *H04B 7/0619* (2013.01); *H04B 7/0634* (2013.01); *H04B 7/0684* (2013.01); *H04B 7/0697* (2013.01); *H04J 11/005* (2013.01); *H04L 5/0048* (2013.01); *H04L 5/0051* (2013.01); *H04L 5/0073* (2013.01); *H04L 5/14* (2013.01); *H04L 25/0206* (2013.01); *H04B 7/0602* (2013.01); *H04B 7/0613* (2013.01); *H04B 7/0802* (2013.01)

(58) Field of Classification Search
CPC ... H04L 5/0048; H04B 7/0615; H04B 7/0697; H04B 7/0684; H04B 7/0634; H04B 7/0619; H04B 7/046; H04B 7/0413; H04B 7/0613; H04B 7/0802; H04B 7/0602; H04J 11/005
See application file for complete search history.

(56) References Cited

U.S. PATENT DOCUMENTS

| | | |
|---|---|---|
| 9,596,065 B2 | 3/2017 | Chen et al. |
| 2009/0054093 A1 | 2/2009 | Kim et al. |
| 2009/0262695 A1 | 10/2009 | Chen et al. |
| 2010/0040005 A1 | 2/2010 | Kim et al. |
| 2010/0210297 A1 | 8/2010 | Simonsson et al. |
| 2011/0098054 A1 | 4/2011 | Gorokhov et al. |
| 2011/0200143 A1 | 8/2011 | Koo et al. |
| 2011/0207415 A1 | 8/2011 | Luo et al. |
| 2012/0002710 A1 | 1/2012 | Park et al. |
| 2012/0014349 A1* | 1/2012 | Chung ............... H04B 7/0684 370/329 |
| 2012/0039273 A1 | 2/2012 | Nam et al. |
| 2012/0099469 A1 | 4/2012 | Luo et al. |
| 2012/0113967 A1 | 5/2012 | Smith et al. |
| 2012/0213095 A1 | 8/2012 | Krishnamurthy et al. |
| 2012/0230372 A1 | 9/2012 | Park et al. |
| 2012/0275411 A1 | 11/2012 | Kim et al. |
| 2012/0281604 A1 | 11/2012 | Papasakellariou et al. |
| 2013/0114468 A1 | 5/2013 | Hui et al. |
| 2013/0250875 A1 | 9/2013 | Chen et al. |
| 2013/0265978 A1* | 10/2013 | Noh ............... H04L 5/0051 370/329 |
| 2014/0334448 A1 | 11/2014 | Langereis et al. |

FOREIGN PATENT DOCUMENTS

| | | |
|---|---|---|
| WO | WO-2008055179 A2 | 5/2008 |
| WO | WO-2011037745 A2 | 3/2011 |
| WO | WO-2011078571 A2 | 6/2011 |
| WO | WO-2013142128 A1 | 9/2013 |

OTHER PUBLICATIONS

European Search Report—EP16198443—Search Authority—The Hague—Jan. 2, 2017.
International Search Report and Written Opinion—PCT/US2013/027655—ISA/EPO—Jan. 31, 2014.
Mitsubishi Electric: "Performance Evaluation of Rank-1 Preceded SRS", 3GPP Draft; R1-100552, 3rd Generation Partnership Project (3GPP), Mobile Competence Centre ; 650, Route Des Lucioles ; F-06921, Sophia-Antipolis Cedex ; France, vol. RAN WG1, No. Valencia, Spain; Jan. 12, 2010, XP050418179, 10 pages.
Motorola: "SRS Enhancements for LTE-A,", 3GPP Draft; R1-100198 SRS Enhancements LTE-A, 3rd Generation Partnershipproject (3GPP), Mobile Competence Centre ; 650, Route Des Lucioles ; F-06921 Sophia-Antipolis Cedex ; France, vol. RAN WG1, Jan. 12, 2010 (Jan. 12, 2010) , XP050597939, [retrieved on Jan. 12, 2010].
Panasonic: "Support of precoded SRS for LTE-Advanced", 3GPP Draft; R1-100379, 3rd Generation Partnership Project (3GPP), Mobile Competence Centre ; 650, Route Des Lucioles ; F-06921 Sophia-Antipolis Cedex ; France, vol. RAN WG1, No. Valencia, Spain; Jan. 18, 2010, Jan. 12, 2010 (Jan. 12, 2010), XP050418042, [retrieved on Jan. 12, 2010].
Partial International Search Report—PCT/US2013/027655—ISA/EPO—Sep. 23, 2013.
European Search Report—EP19193430—Search Authority—The Hague—dated Dec. 10, 2019.
NTT DOCOMO: "Views on Aperiodic Sounding Resources", 3GPP Draft; R1-104937 Aperiodic SRS, 3rd Generation Partnership Project (3GPP), Mobile Competence Centre; 650, Route Des Lucioles; F-06921 Sophia-Antipolis Cedex; France; vol. RAN WG1, No. Madrid, Spain; Aug. 23, 2010, Aug. 19, 2010, XP050450208, [retrieved on Aug. 19, 2010], Sect.s 2. 3, 7 pages.
Potevio: "Proposal for an Enhanced SRS Scheme for CoMP", 3GPP Draft; R1-100616, 3rd Generation Partnership Project (3GPP), Mobile Competence Centre; 650, Route Des Lucioles; F-06921 Sophia-Antipolis Cedex; France, vol. RAN WG1, No. Valencia, Spain; Jan. 10, 2010, Jan. 12, 2010 (Jan. 12, 2010), XP050418221, 6 pages, [retrieved on Jan. 12, 2010] * section 2.1*.

* cited by examiner

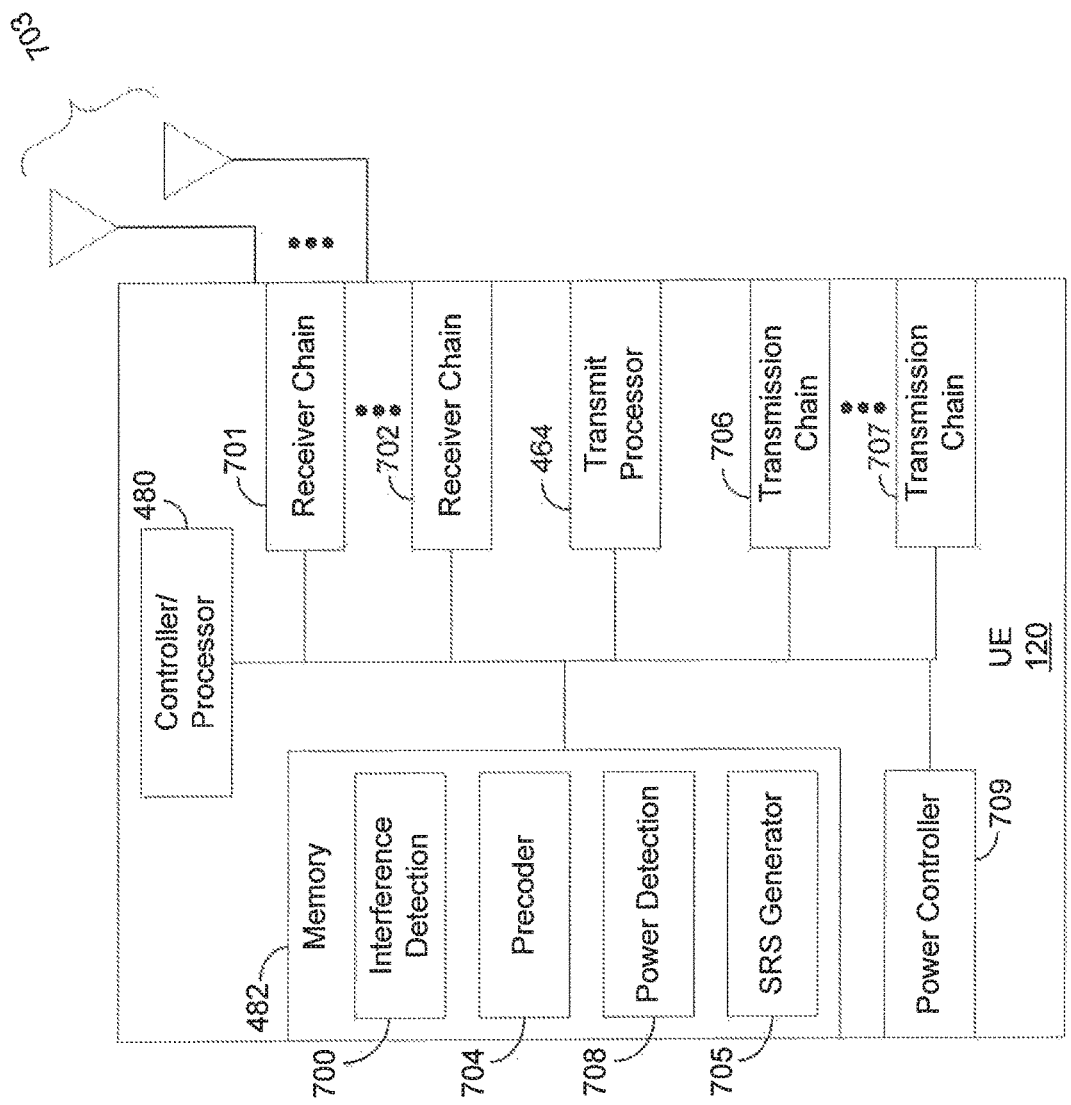

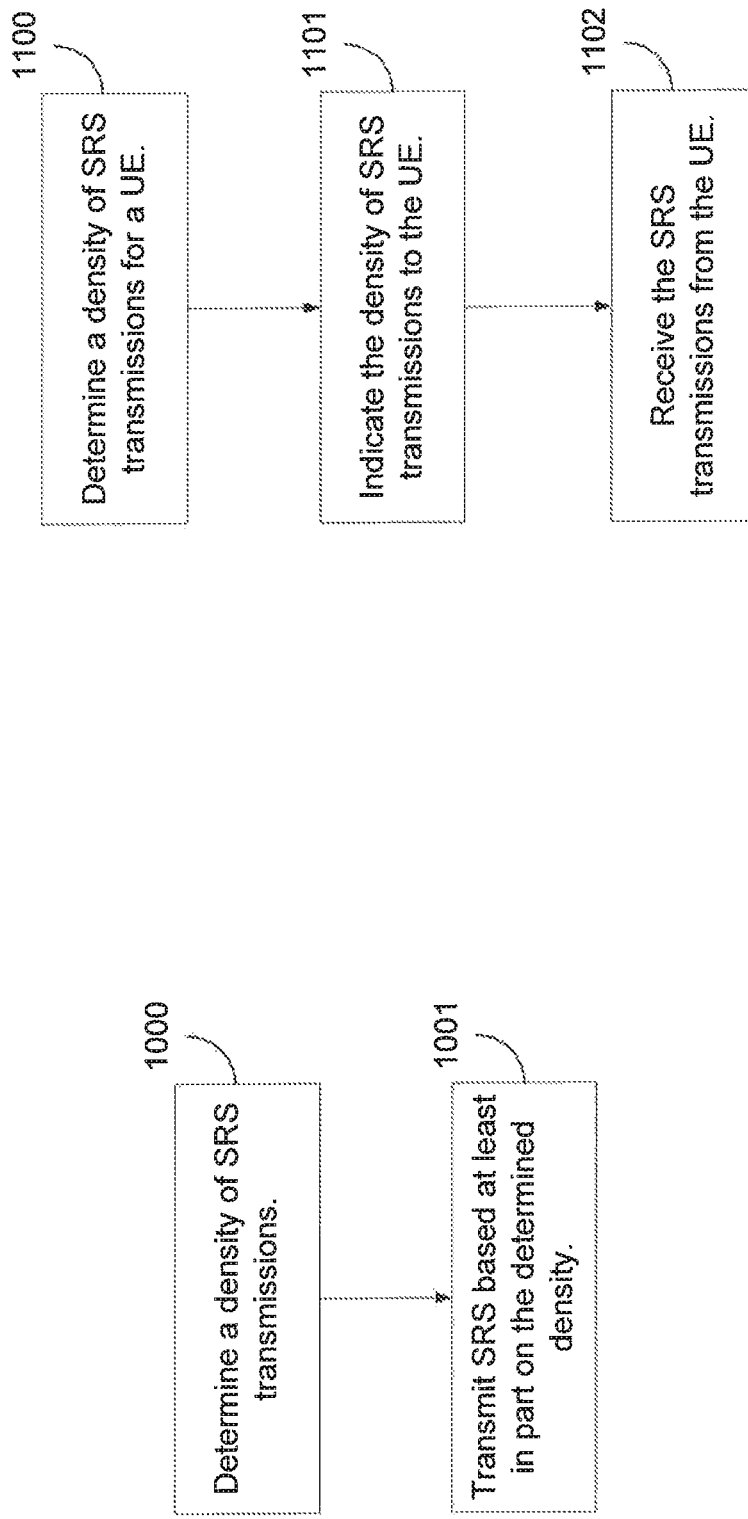

ENHANCED SRS TRANSMISSION FOR MIMO OPERATION IN LTE-A

CROSS-REFERENCE TO RELATED APPLICATIONS

This application is a division of U.S. patent application Ser. No. 13/773,316, entitled, "ENHANCED SRS TRANSMISSION FOR MIMO OPERATION IN LTE-A," filed on Feb. 21, 2013, which claims the benefit of U.S. Provisional Patent Application No. 61/718,119, entitled, "ENHANCED SRS TRANSMISSION FOR MIMO OPERATION IN LTE-A," filed on Oct. 24, 2012, both of which are expressly incorporated by reference herein in their entirety.

BACKGROUND

Field

Aspects of the present disclosure relate generally to wireless communication systems, and more particularly, to enhanced sounding reference signal (SRS) transmission for multiple input, multiple output (MIMO) operation in Long Term Evolution Advanced (LTE-A).

Background

Wireless communication networks are widely deployed to provide various communication services such as voice, video, packet data, messaging, broadcast, and the like. These wireless networks may be multiple-access networks capable of supporting multiple users by sharing the available network resources. Such networks, which are usually multiple access networks, support communications for multiple users by sharing the available network resources. One example of such a network is the Universal Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). Examples of multiple-access network formats include Code Division Multiple Access (CDMA) networks, Time Division Multiple Access (TDMA) networks, Frequency Division Multiple Access (FDMA) networks, Orthogonal FDMA (OFDMA) networks, and. Single-Carrier FDMA (SC-FDMA) networks.

A wireless communication network may include a number of base stations or node Bs that can support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance the UMTS technologies not only to meet the growing demand for mobile broadband access, but to advance and enhance the user experience with mobile communications.

SUMMARY

In one aspect of the disclosure, a method of wireless communication that includes detecting, at a mobile device, an observed interference level for each one of a plurality of receiver chains of the mobile device, in response to detecting an imbalance in the observed interference level for the plurality of receiver chains, precoding a sounding reference signal (SRS) to indicate the imbalance, and transmitting the precoded SRS.

In an additional aspect of the disclosure, a method of wireless communication that includes determining, by a base station, a precoded SRS vector for one or more UE, wherein the determined precoded SRS vector includes either determining the precoded SRS vector on a per UE basis, enabling the precoded SRS vector for either one or both of a frequency division duplex (FDD) system or a time division duplex (TDD) system, or enabling the precoded SRS vector for aperiodic SRS only, and transmitting the determined precoded SRS vector from the base station to at least one of the one or more UEs.

In an additional aspect of the disclosure, a method of wireless communication that includes determining, at a mobile device, a density of SRS transmissions and transmitting SRS by the mobile device based at least in part on the determined density In an additional aspect of the disclosure, a method of wireless communication that includes determining, at a base station, a density of SRS transmissions for a UE, indicating the density of SRS transmissions to the UE, and receiving, at the base station, the SRS transmissions from the UE.

In an additional aspect of the disclosure, an apparatus configured for wireless communication that includes means for detecting, at a mobile device, an observed interference level for each one of a plurality of receiver chains of the mobile device, means, executable in response to detecting an imbalance in the observed interference level for the plurality of receiver chains, for preceding a SRS to indicate the imbalance, and means for transmitting the precoded SRS.

In an additional aspect of the disclosure, an apparatus configured for wireless communication that includes means for determining, by a base station, a precoded SRS vector for one or more UEs, wherein the determined precoded SRS vector includes either means for determining the precoded SRS vector on a per UE basis, means for enabling the preceded SRS vector for either one or both of a MD system or a TDD system, or means for enabling the precoded SRS vector for aperiodic SRS only, and means for transmitting the determined precoded SRS vector from the base station to at least one of the one or more UEs.

In an additional aspect of the disclosure, an apparatus configured for wireless communication that includes means for determining, at a mobile device, a density of SRS transmissions, and means for transmitting SRS by the mobile device based at least in part on the determined density.

In an additional aspect of the disclosure, an apparatus configured for wireless communication that includes means for determining, at a base station, a density of SRS transmissions for a UE, means for indicating the density of SRS transmissions to the UE, and means for receiving, at the base station, the SRS transmissions from the UE.

In an additional aspect of the disclosure, a computer program product for wireless communications in a wireless network having a non-transitory computer-readable medium having program code recorded thereon. The program cede includes code for causing at least one computer to detect, at a mobile device, an observed interference level for each one of a plurality of receiver chains of the mobile device, code, executable in response to detecting an imbalance in the observed interference level for the plurality of receiver chains, for causing at least one computer to precode a SRS to indicate the imbalance, and code to transmit the precoded SRS.

In an additional aspect of the disclosure, a computer program product for wireless communications in a wireless network having a non-transitory computer-readable medium having program code recorded thereon. The program code includes code for causing at least one computer to determine, by a base station, a precoded SRS vector for one or more UEs, wherein the determined precoded SRS vector includes either code for causing at least one computer to determine the precoded SRS vector on a per UE basis, code for causing at least one computer to enable the precoded SRS vector for either one or both of a FDD systems or a TDD system, or code for causing at least one computer to enable the precoded SRS vector for aperiodic SRS only. The program code also includes code for causing at least one computer to transmit the determined precoded SRS vector from the base station to at least one of the one or more UEs.

In an additional aspect of the disclosure, a computer program product for wireless communications in a wireless network having a non-transitory computer-readable medium having program code recorded thereon. The program code includes code for causing at least one computer to determine, at a mobile device, a density of SRS transmissions and code for causing at least one computer to transmit SRS by the mobile device based at least in part on the determined density.

In an additional aspect of the disclosure, a computer program product for wireless communications in a wireless network having a non-transitory computer-readable medium having program code recorded thereon. The program code includes code for causing at least one computer to determine, at a base station, a density of SRS transmissions for a UE, code for causing at least one computer to indicate the density of SRS transmissions to the UE, and code for causing at least one computer to receive, at the base station, the SRS transmissions from the UE.

In an additional aspect of the disclosure, an apparatus configured for wireless communication that includes at least one processor and a memory coupled to the processor. The processor is configured to detect, at a mobile device, an observed interference level for each one of a plurality of receiver chains of the mobile device, to precode a SRS to indicate the imbalance in response to detecting an imbalance in the observed interference level for the plurality of receiver chains, and to transmit the precoded SRS.

In an additional aspect of the disclosure, an apparatus configured for wireless communication that includes at least one processor and a memory coupled to the processor. The processor is configured to determine, by a base station, a precoded SRS vector for one or more UEs, wherein the determined precoded SRS vector includes configuration of the processor either to determine the precoded SRS vector on a per UE basis, to enable the precoded SRS vector for one or both of a FDD system or a TDD system, or to enable the precoded SRS vector for aperiodic SRS only. The processor is further configured to transmit the determined precoded SRS vector from the base station to at least one of the one or more UEs.

In an additional aspect of the disclosure, an apparatus configured for wireless communication that includes at least one processor and a memory coupled to the processor. The processor is configured to determine, at a mobile device, a density of SRS transmissions and to transmit SRS by the mobile device based at least in part on the determined density.

In an additional aspect of the disclosure, an apparatus configured for wireless communication that includes at least one processor and a memory coupled to the processor. The processor is configured to determine, at a base station, a density of SRS transmissions for a UE, to indicate the density of SRS transmissions to the UE, and to receive, at the base station, the SRS transmissions from the UE.

BRIEF DESCRIPTION OF THE DRAWINGS

FIG. 7 is a functional block diagram illustrating example blocks executed to implement one aspect of the present disclosure.

FIG. 8 is a block diagram illustrating a UE configured according to one aspect of the present disclosure.

FIG. 10 is a functional block diagram illustrating example blocks executed to implement one aspect of the present disclosure.

FIG. 11 is a functional block diagram illustrating example blocks executed to implement one aspect of the present disclosure.

DETAILED DESCRIPTION

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

The techniques described herein may be used for various wireless communication networks such as CDMA, TDMA, FDMA, OFDMA, SC-FDMA and other networks. The terms "network" and "system" are often used interchangeably. A CDMA network may implement a radio technology, such as Universal Terrestrial Radio Access (UTRA), Telecommunications Industry Association's (TIA's) CDMA2000®, and the like. The UTRA technology includes Wideband CDMA (WCDMA) and other variants of CDMA. The CDMA2000® technology includes the IS-2000, IS-95 and IS-856 standards from the Electronics Industry Alliance (EIA) and TIA. A TDMA network may implement a radio technology, such as Global System for Mobile Communications (GSM). An OFDMA network may implement a radio technology, such as Evolved UTRA (E-UTRA), Ultra Mobile Broadband (UMB), IEEE 802.11 (Wi-Fi), IEEE 802.16 (WiMAX), IEEE 802.20, Flash-OFDMA, and the like. The UTRA and E-UTRA technologies are part of Universal Mobile Telecommunication System (UMTS). 3GPP Long Term Evolution (LTE) and LTE-Advanced (LTE-A) are newer releases of the UMTS that use E-UTRA, UTRA, E-UTRA, UMTS, LTE, LTE-A and GSM are described in documents from an organization called the "3rd Generation Partnership Project" (3GPP). CDMA2000® and UMB are described in documents from an organization called the "3rd Generation Partnership Project 2" (3GPP2). The techniques described herein may be used for the wireless networks and radio access technologies mentioned above, as well as other wireless networks and radio access technologies. For clarity, certain aspects of the techniques are described below for LTE or LTE-A (together referred to in the alternative as "LTE/-A") and use such LTE/-A terminology in much of the description below.

Figure 1:
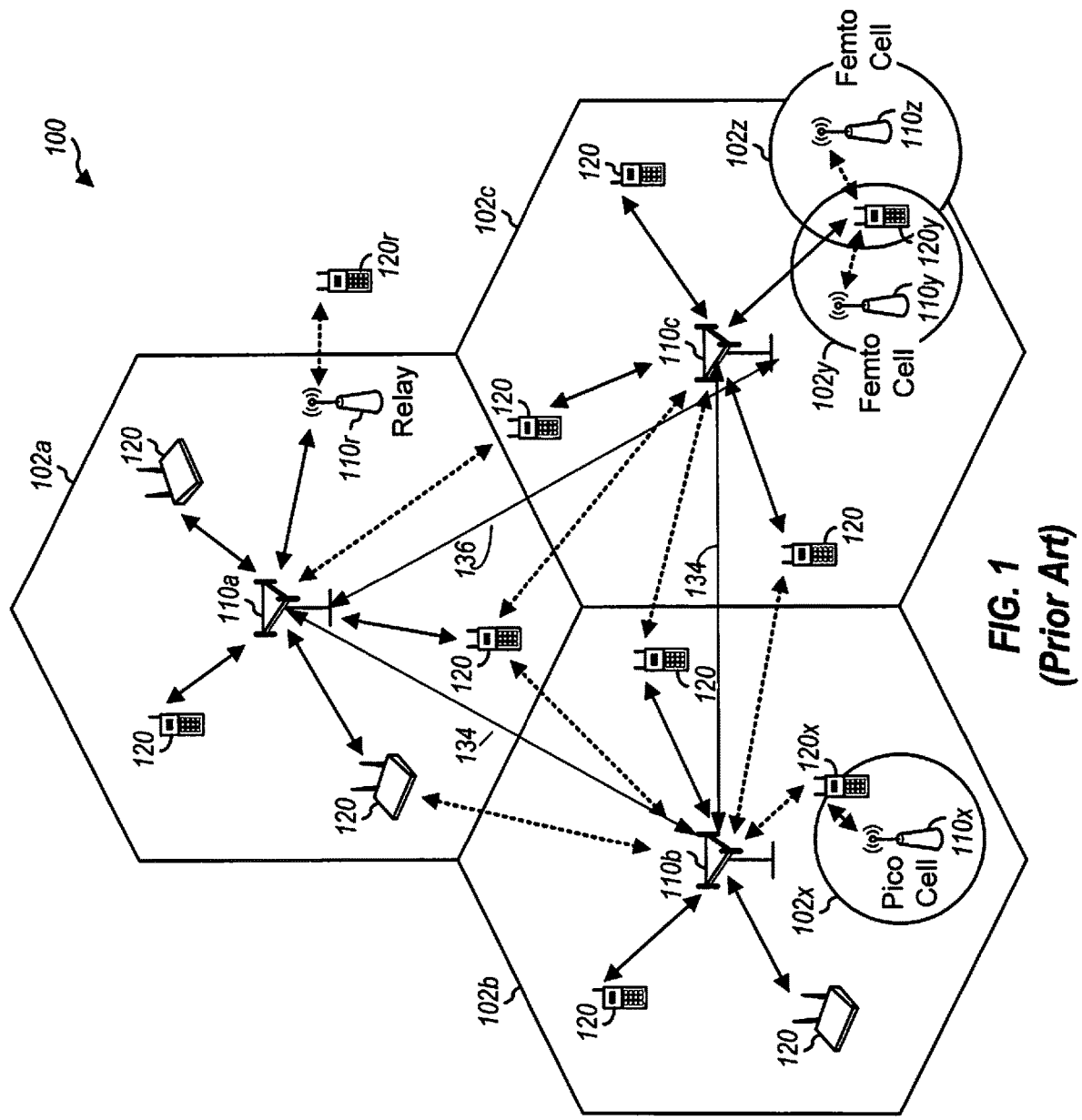
FIG. 1 is a block diagram conceptually illustrating an example of a mobile communication system.

FIG. 1 shows a wireless network 100 for communication, which may be an LTE-A network. The wireless network 100 includes a number of evolved node Bs (eNBs) 110 and other network entities. An eNB may be a station that communicates with the UEs and may also be referred to as a base station, a node B, an access point, and the like. Each eNB may also communicate with each other for interference coordination or other such network management procedures over backhaul connections 134 and 136. Each eNB 110 may provide communication coverage for a particular geographic area. In 3GPP, the term "cell" can refer to this particular geographic coverage area of an eNB and/or an eNB subsystem serving the coverage area, depending on the context in which the term is used.

An eNB may provide communication coverage for a macro cell, a pico cell, a femto cell, and/or other types of cell. A macro cell generally covers a relatively large geographic area (e.g., several kilometers in radius) and may allow unrestricted access by UEs with service subscriptions with the network provider. A pico cell would generally cover a relatively smaller geographic area and may allow unrestricted access by UEs with service subscriptions with the network provider. A femto cell would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). An eNB for a macro cell may be referred to as a macro eNB. An eNB for a pico cell may be referred to as a pico eNB. And, an eNB for a femto cell may be referred to as a femto eNB or a home eNB. In the example shown in FIG. 1, the eNBs 110a, 110b and 110c are macro eNBs for the macro cells 102a, 102b and 102c, respectively. The eNB 110x is a pico eNB for a pico cell 102x. And, the eNBs 110y and 110z are femto eNBs for the femto cells 102y and 102z, respectively. An eNB may support one or multiple (e.g., two, three, four, and the like) cells.

The wireless network 100 also includes relay stations. A relay station is a station that receives a transmission of data and/or other information from an upstream station (e.g., an eNB, a UE, or the like) and sends a transmission of the data and/or other information to a downstream station (e.g., another UE, another eNB, or the like). A relay station may also be a LIE that relays transmissions for other UEs. In the example shown in FIG. 1, a relay station 110r may communicate with the eNB 110a and a UE 120r, in which the relay station 110r acts as a relay between the two network elements (the eNB 110a and the UE 120r) in order to facilitate communication between them. A relay station may also be referred to as a relay eNB, a relay, and the like.

The wireless network 100 may support synchronous or asynchronous operation. For synchronous operation, the eNBs may have similar frame timing, and transmissions from different eNBs may be approximately aligned in time. For asynchronous operation, the eNBs may have different frame timing, and transmissions from different eNBs may not be aligned in time.

The UEs 120 are dispersed throughout the wireless network 100, and each UE may be stationary or mobile. A UE may also be referred to as a terminal, a mobile station, a subscriber unit, a station, or the like. A UE may be a cellular phone, a personal digital assistant (PDA), a wireless modem, a wireless communication device, a handheld device, a tablet computer, a laptop computer, a cordless phone, a wireless local loop (WLL) station, or the like. A UE may be able to communicate with macro eNBs, pica eNBs, femto eNBs, relays, and the like. In FIG. 1, a solid line with double arrows indicates desired transmissions between a UE and a serving eNB, which is an eNB designated to serve the UE on the downlink and/or uplink. A dashed line with double arrows indicates interfering transmissions between a UE and an eNB.

utilizes orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, or the like. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, K may be equal to 72, 180, 300, 600, 900, and 1200 for a corresponding system bandwidth of 1.4, 3, 5, 10, 15, or 20 megahertz (MHz), respectively. The system bandwidth may also be partitioned into sub-bands. For example, a sub-band may cover 1.08 MHz, and there may be 1, 2, 4, 8 or 16 sub-bands for a corresponding system bandwidth of 1.4, 3, 5, 10, 15, or 20 MHz, respectively.

Figure 2:
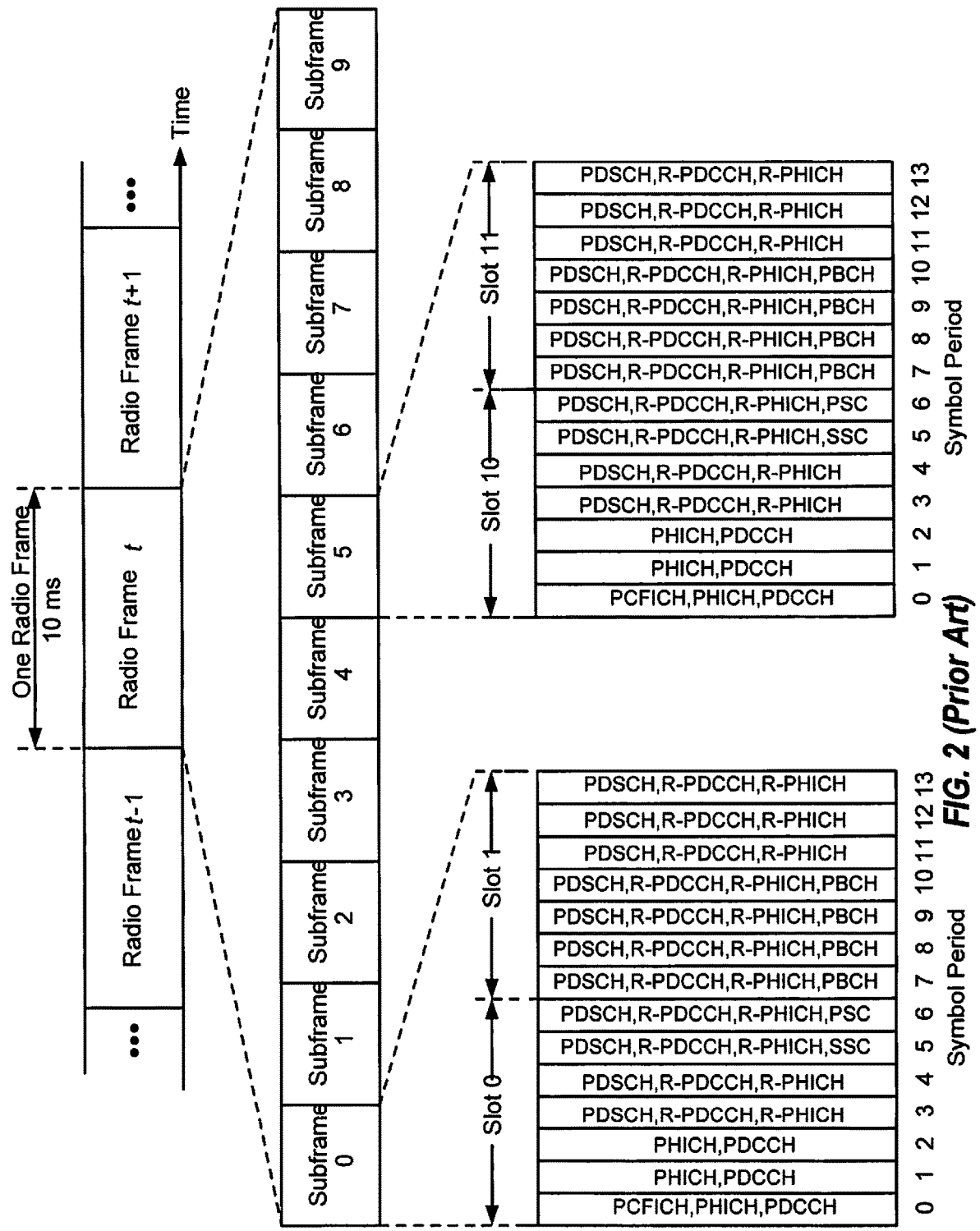
FIG. 2 is a block diagram conceptually illustrating an example of a downlink frame structure in a mobile communication system.

FIG. 2 shows a downlink frame structure used in LTE/-A. The transmission timeline for the downlink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19, Each slot may include L symbol periods, e.g., 7 symbol periods for a normal cyclic prefix (as shown in FIG. 2) or 6 symbol periods for an extended cyclic prefix. The 2L symbol periods in each subframe may be assigned indices of 0 through 2L-1. The available time frequency resources may be partitioned into resource blocks. Each resource block may cover N subcarriers (e.g., 12 subcarriers) in one slot.

in LTE/-A, an eNB may send a primary synchronization signal (PSS) and a secondary synchronization signal (SSS) for each cell in the eNB. The primary and secondary synchronization signals may be sent in symbol periods 6 and 5, respectively, in each of subframes 0 and 5 of each radio frame with the normal cyclic prefix, as shown in FIG. 2. The synchronization signals may be used by UEs for cell detection and acquisition. The eNB may send a Physical Broadcast Channel (PBCH) in symbol periods 0 to 3 in slot 1 of subframe 0. The PBCH may carry certain system information.

The eNB may send a Physical Control Format Indicator Channel (PCFICH) in the first symbol period of each subframe, as seen in FIG. 2. The PCFICH may convey the number of symbol periods (M) used for control channels, where M may be equal to 1, 2 or 3 and may change from subframe to subframe. M may also be equal to 4 for a small system bandwidth, e.g., with less than 10 resource blocks. In the example shown in FIG. 2, M=3. The eNB may send a Physical HARQ Indicator Channel (PHICH) and a Physical Downlink Control Channel (PDCCH) in the first M symbol periods of each subframe. The PDCCH and PHICH are also included in the first three symbol periods in the example shown in FIG. 2. The PHICH may carry information to support hybrid automatic retransmission (HARQ). The PDCCH may carry information on resource allocation for UEs and control information for downlink channels. The eNB may send a Physical Downlink Shared Channel (PDSCH) in the remaining symbol periods of each subframe. The PDSCH may carry data for UEs scheduled for data transmission on the downlink.

In addition to sending PHICH and PDCCH in the control section of each subframe, i.e., the first symbol period of each subframe, the LTE-A may also transmit these control-oriented channels in the data portions of each subframe as well. As shown in FIG. 2, these new control designs utilizing the data region, e.g., the Relay-Physical Downlink Control Channel (R-PDCCH) and Relay-Physical HARQ Indicator Channel (R-PHICH) are included in the later symbol periods of each subframe. The R-PDCCH is a new type of control channel utilizing the data region originally developed in the context of half-duplex relay operation. Different from legacy PDCCH and PHICH, which occupy the first several control symbols in one subframe, R-PDCCH and R-PHICH are mapped to resource elements (REs) originally designated as the data region. The new control channel may be in the form of Frequency Division Multiplexing (FDM). Time Division Multiplexing (TDM), or a combination of FDM and TDM.

The eNB may send the PSS, SSS and PBCH in the center 1.08 MHz of the system bandwidth used by the eNB. The eNB may send the PCFICH and PHICH across the entire system bandwidth in each symbol period in which these channels are sent. The eNB may send the PDCCH to groups of UEs in certain portions of the system bandwidth. The eNB may send the PDSCH to specific UEs in specific portions of the system bandwidth. The eNB may send the PSS, SSS, PBCH, PCFICH and PHICH in a broadcast manner to all UEs, may send the PDCCH in a unicast manner to specific UEs, and may also send the PDSCH in a unicast manner to specific UEs.

A number of resource elements may be available in each symbol period. Each resource element may cover one subcarrier in one symbol period and may be used to send one modulation symbol, which may be a real or complex value. Resource elements not used for a reference signal in each symbol period may be arranged into resource element groups (REGs). Each REG may include four resource elements in one symbol period. The PCFICH may occupy four REGs, which may be spaced approximately equally across frequency, in symbol period 0. The PHICH may occupy three REGs, which may be spread across frequency, in one or more configurable symbol periods. For example, the three REGs for the PHICH may all belong in symbol period 0 or may be spread in symbol periods 0, 1 and 2, The PDCCH may occupy 9, 18, 32 or 64 REGs, which may be selected from the available REGs, in the first M symbol periods. Only certain combinations of REGs may be allowed for the PDCCH.

A UE may know the specific REGs used for the PHICH and the PCFICH. The UE may search different combinations of REGs for the PDCCH. The number of combinations to search is typically less than the number of allowed combinations for the PDCCH. An eNB may send the PDCCH to the UE in any of the combinations that the UE will search.

A UE may be within the coverage of multiple eNBs. One of these eNBs may be selected to serve the UE. The serving eNB may be selected based on various criteria such as received power, path loss, signal-to-noise ratio (SNR), etc.

Figure 3:
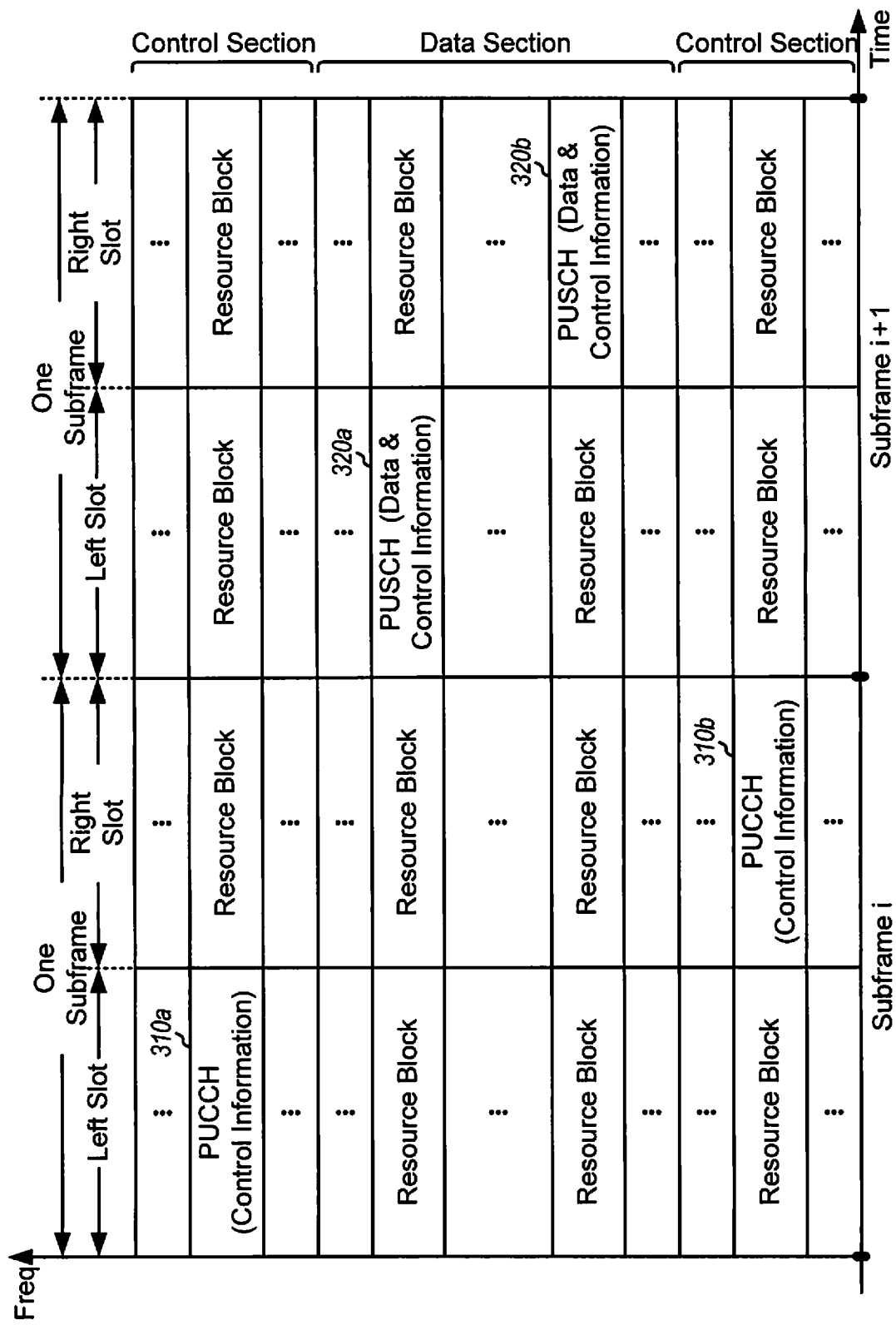
FIG. 3 is a block diagram conceptually illustrating an exemplary frame structure in uplink LTE/-A communications.

FIG. 3 is a block diagram illustrating an exemplary frame structure 300 in uplink long term evolution (LTE/-A) communications. The available resource blocks (RBs) for the uplink may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The design in FIG. 3 results in the data section including contiguous subcarriers, which may allow a single UE to be assigned all of the contiguous subcarriers in the data section.

A UE may be assigned resource blocks in the control section to transmit control information to an eNB. The UE may also be assigned resource blocks in the data section to transmit data to the eNode B. The UE may transmit control information in a Physical Uplink Control Channel (PUCCH) on the assigned resource blocks 310a and 310b in the control section. The UE may transmit only data or both data and control information in a Physical Uplink Shared Channel (PUSCH) on the assigned resource blocks 320a and 320b in the data section. An uplink transmission may span both slots of a subframe and may hop across frequency as shown in FIG. 3.

Referring back to FIG. 1, the wireless network 100 uses the diverse set of eNBs 110 (i.e., macro eNBs, pico eNBs, femto eNBs, and relays) to improve the spectral efficiency of the system per unit area. Because the wireless network 100 uses such different eNBs for its spectral coverage, it may also be referred to as a heterogeneous network. The macro eNBs 110a-c are usually carefully planned and placed by the provider of the wireless network 100. The macro eNBs 110a-c generally transmit at high power levels (e.g., 5 W-40 W). The pico eNB 110x and the relay station 110r, which generally transmit at substantially lower power levels (e.g., 100 mW-2 W), may be deployed in a relatively unplanned manner to eliminate coverage holes in the coverage area provided by the macro eNBs 110a-c and improve capacity in the hot spots. The femto eNBs 110y-z, which are typically deployed independently from the wireless network 100 may, nonetheless, be incorporated into the coverage area of the wireless network 100 either as a potential access point to the wireless network 100, if authorized by their administrator(s), or at least as an active and aware eNB that may communicate with the other eNBs 110 of the wireless network 100 to perform resource coordination and coordination of interference management. The femto eNBs 110*y-z* typically also transmit at substantially lower power levels (e.g., 100 mW-2 W) than the macro eNBs 110*a-c*.

In operation of a heterogeneous network, such as the wireless network 100, each UE is usually served by the eNB 110 with the better signal quality, while the unwanted signals received from the other eNBs 110 are treated as interference. While such operational principals can lead to significantly sub-optimal performance, gains in network performance are realized in the wireless network 100 by using intelligent resource coordination among the eNBs 110, better server selection strategies, and more advanced techniques for efficient interference management.

A pico eNB, such as the pico eNB 110*x*, is characterized by a substantially lower transmit power when compared with a macro eNB, such as the macro eNBs 110*a-c*. A pico eNB will also usually be placed around a network, such as the wireless network 100, in an ad hoc manner. Because of this unplanned deployment, wireless networks with pico eNB placements, such as the wireless network 100, can be expected to have large areas with low signal to interference conditions, which can make for a more challenging RF environment for control channel transmissions to UEs on the edge of a coverage area or cell (a "cell-edge" UE). Moreover, the potentially large disparity (e.g., approximately 20 dB) between the transmit power levels of the macro eNBs 110*a-c* and the pico eNB 110*x* implies that, in a mixed deployment, the downlink coverage area of the pico eNB 110*x* will be much smaller than that of the macro eNBs 110*a-c*.

In the uplink case, however, the signal strength of the uplink signal is governed by the UE, and, thus, will be similar when received by any type of the eNBs 110. With the uplink coverage areas for the eNBs 110 being roughly the same or similar, uplink handoff boundaries will be determined based on channel gains. This can lead to a mismatch between downlink handover boundaries and uplink handover boundaries. Without additional network accommodations, the mismatch would make the server selection or the association of UE to eNB more difficult in the wireless network 100 than in a macro eNB-only homogeneous network, where the downlink and uplink handover boundaries are more closely matched.

If server selection is based predominantly on downlink received signal strength, the usefulness of mixed eNB deployment of heterogeneous networks, such as the wireless network 100, will be greatly diminished. This is because the larger coverage area of the higher powered macro eNBs, such as the macro eNBs 110*a-c*, limits the benefits of splitting the cell coverage with the pico eNBs, such as the pico eNB 110*x*, because, the higher downlink received signal strength of the macro eNBs 110*a-c* will attract all of the available UEs, while the pico eNB 110*x* may not be serving any UE because of its much weaker downlink transmission power. Moreover, the macro eNBs 110*a-c* will likely not have sufficient resources to efficiently serve those UEs. Therefore, the wireless network 100 will attempt to actively balance the load between the macro eNBs 110*a-c* and the pico eNB 110*x* by expanding the coverage area of the pico eNB 110*x*. This concept is referred to as cell range extension (CRE).

The wireless network 100 achieves CRE by changing the manner in which server selection is determined. Instead of basing server selection on downlink received signal strength, selection is based more on the quality of the downlink signal. In one such quality-based determination, server selection may be based on determining the eNB that offers the minimum path loss to the UE. Additionally, the wireless network 100 provides a fixed partitioning of resources between the macro eNBs 110*a-c* and the pico eNB 110*x*. However, even with this active balancing of load, downlink interference from the macro eNBs 110*a-c* should be mitigated for the UEs served by the pico eNBs, such as the pico eNB 110*x*. This can be accomplished by various methods, including interference cancellation at the UE, resource coordination among the eNBs 110, or the like.

In a heterogeneous network with cell range extension, such as the wireless network 100, in order for UEs to obtain service from the lower-powered eNBs, such as the pico eNB 110*x*, in the presence of the stronger downlink signals transmitted from the higher-powered eNBs, such as the macro eNBs 110*a-c*, the pico eNB 110*x* engages in control channel and data channel interference coordination with the dominant interfering ones of the macro eNBs 110*a-c*. Many different techniques for interference coordination may be employed to manage interference. For example, inter-cell interference coordination (ICIC) may be used to reduce interference from cells in co-channel deployment. One ICIC mechanism is adaptive resource partitioning. Adaptive resource partitioning assigns subframes to certain eNBs. In subframes assigned to a first eNB, neighbor eNBs do not transmit. Thus, interference experienced by a UE served by the first eNB is reduced. Subframe assignment may be performed on both the uplink and downlink channels.

For example, subframes may be allocated between three classes of subframes: protected subframes (U subframes), prohibited subframes (N subframes), and common subframes (C subframes). Protected subframes are assigned to a first eNB for use exclusively by the first eNB. Protected subframes may also be referred to as "clean" subframes based on the lack of interference from neighboring eNBs. Prohibited subframes are subframes assigned to a neighbor eNB, and the first eNB is prohibited from transmitting data during the prohibited subframes. For example, a prohibited subframe of the first eNB may correspond to a protected subframe of a second interfering eNB. Thus, the first eNB is the only eNB transmitting data during the first eNB's protected subframe. Common subframes may be used for data transmission by multiple eNBs. Common subframes may also be referred to as "unclean" subframes because of the possibility of interference from other eNBs.

At least one protected subframe is statically assigned per period. In some cases only one protected subframe is statically assigned. For example, if a period is 8 milliseconds, one protected subframe may be statically assigned to an eNB during every 8 milliseconds. Other subframes may be dynamically allocated.

Adaptive resource partitioning information (ARPI) allows the non-statically assigned subframes to be dynamically allocated. Any of protected, prohibited, or common subframes may be dynamically allocated (AU, AN, AC subframes, respectively). The dynamic assignments may change quickly, such as, for example, every one hundred milliseconds or less.

Heterogeneous networks may have eNBs of different power classes. For example, three power classes may be defined, in decreasing power class, as macro eNBs, pico eNBs, and femto eNBs. When macro eNBs, pico eNBs, and femto eNBs are in a co-channel deployment, the power spectral density (PSD) of the macro eNB (aggressor eNB) may be larger than the PSD of the pica eNB and the femto eNB (victim eNBs) creating large amounts of interference with the pico eNB and the femto eNB. Protected subframes may be used to reduce or minimize interference with the pico eNBs and femto eNBs. That is, a protected subframe may be scheduled for the victim eNB to correspond with a prohibited subframe on the aggressor eNB.

Figure 4:
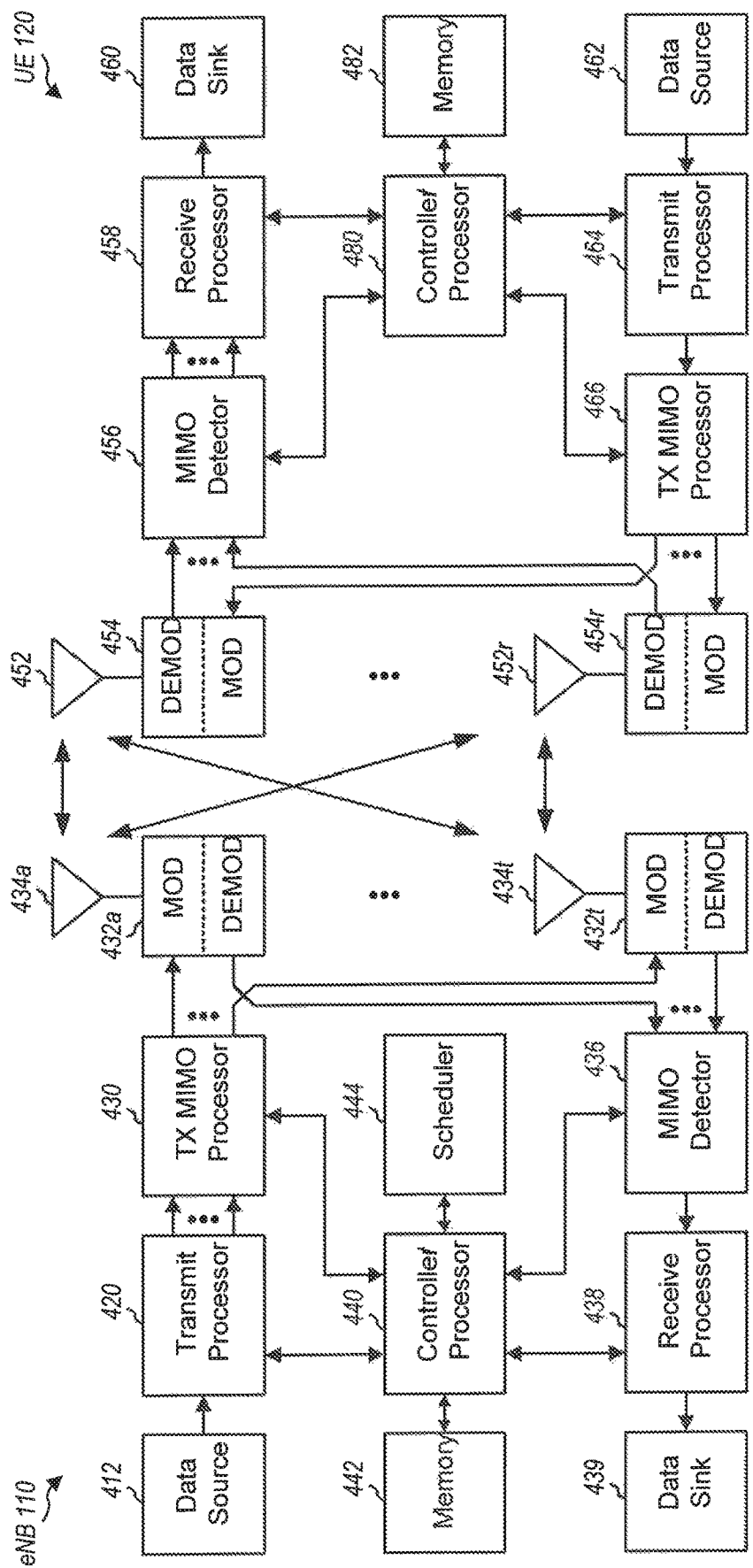
FIG. 4 is a block diagram conceptually illustrating a design of a base station/eNB and a UE configured according to one aspect of the present disclosure.

FIG. 4 shows a block diagram of a design of a base station/eNB 110 and a UE 120, which may be one of the base stations/eNBs and one of the UEs in FIG. 1. For a restricted association scenario, the eNB 110 may be the macro eNB 110c in FIG. 1, and the UE 120 may be the UE 120y. The eNB 110 may also be a base station of some other type. The eNB 110 may be equipped with antennas 434a through 434t, and the UE 120 may be equipped with antennas 452a through 452r.

At the eNB 110, a transmit processor 420 may receive data from a data source 412 and control information from a controller/processor 440. The control information may be for the PBCH, PCFICH, PHICH, PDCCH, etc. The data may be for the PDSCH, etc. The transmit processor 420 may process (e.g., encode and symbol map) the data and control information to obtain data symbols and control symbols, respectively. The transmit processor 420 may also generate reference symbols, e.g., for the PSS, SSS, and cell-specific reference signal. A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. Each modulator 432 may process a respective output symbol stream (e.g., for OFDM, etc.) to obtain an output sample stream. Each modulator 432 may further process (e.g., convert to analog, amplify, filter, and upconvert) the output sample stream to obtain a downlink signal. Downlink signals from modulators 432a through 432t may be transmitted via the antennas 434a through 434t, respectively.

At the UE 120, the antennas 452a through 452r may receive the downlink signals from the eNB 110 and may provide received signals to the demodulators (DEMODs) 454a through 454r, respectively. Each demodulator 454 may condition (e.g., filter, amplify, downconvert, and digitize) a respective received signal to obtain input samples. Each demodulator 454 may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. A receive processor 458 may process (e.g., demodulate, deinterleave, and decode) the detected symbols, provide decoded data for the UE 120 to a data sink 460, and provide decoded control information to a controller/processor 480.

On the uplink, at the UE 120, a transmit processor 464 may receive and process data (e.g., for the PUSCH) from a data source 462 and control information (e.g., for the PUCCH) from the controller/processor 480. The transmit processor 464 may also generate reference symbols for a reference signal. The symbols from the transmit processor 464 may be precoded by a TX MIMO processor 466 if applicable, further processed by the demodulators 454a through 454r (e.g., for SC-FDM, etc.), and transmitted to the eNB 110. At the eNB 110, the uplink signals from the UE 120 may be received by the antennas 434, processed by the modulators 432, detected by a MEMO detector 436 if applicable, and further processed by a receive processor 438 to obtain decoded data and control information sent by the UE 120. The processor 438 may provide the decoded data to a data sink 439 and the decoded control information to the controller/processor 440.

The controllers/processors 440 and 480 may direct the operation at the eNB 110 and the UE 120, respectively. The controller/processor 440 and/or other processors and modules at the eNB 110 may perform or direct the execution of various processes for the techniques described herein. The controllers/processor 480 and/or other processors and modules at the UE 120 may also perform or direct the execution of the functional blocks illustrated in FIGS. 6 and 7, and/or other processes for the techniques described herein. The memories 442 and 482 may store data and program codes for the eNB 110 and the UE 120, respectively. A scheduler 444 may schedule UEs for data transmission on the downlink and/or uplink.

Sounding Reference Signals (SRSs) are used for a variety of functions, including uplink link adaptation, downlink scheduling under channel reciprocity (especially for TDD systems), coordinated multi-point (CoMP) operation, and the like. SRS may be used for uplink power control, subband scheduling and timing tracking, as well as adaptive uplink antenna switching. On the downlink side, in addition to downlink scheduling, SRS may also be used in beamforming. SRS is generally tied with a physical cell identifier (ID) common to all UEs in a given cell.

There are generally two types of SRS configurations: cell-specific configurations and UE-specific configurations. In cell-specific configurations, a cell may allow SRS transmissions from one or more UEs at various rates, up to SRS transmissions in every uplink subframe. Typically cell-specific SRS bandwidth will cover most of the uplink system bandwidth, excluding the PUCCH region. In UE-specific configurations, SRS transmission instances, within cell-specific SRS transmission instances, transmit on a bandwidth as small as 4 RBs. The UE-specific configurations may use various techniques for transmitting a UE-specific SRS within the cell-specific SRS transmission, such as, cyclic shift, comb (0 or 1) (which identifies the particular carriers within each resource block on which the SRS will be transmitted), frequency starting position, hopping patterns, the number of antenna port(s) for transmission, and the like. SRS hopping may be enabled to allow cyclically sounding the entire or a fraction of the cell-specific SRS bandwidth.

Transmission of SRS may be both periodic and aperiodic. Both periodic and aperiodic SRS are transmitted by the UE in UE-specific periodic SRS subframes, which are a subset of cell-specific SRS subframes. Periodic SRS provide a certain set of information to be transmitted by the UE on a periodic basis. Once configured, UEs will continue to transmit such SRS until being de-configured or changed by some signal, such as an RRC signal. Aperiodic SRS may be triggered in a more dynamic manner and may include additional information that is useful for base station analysis. Aperiodic SRS are currently triggered in a UE by a PDCCH. PDCCH may trigger aperiodic SRS in PDCCH for UL grants in format 0 (1-bit) and 4 (2-bit), and in PDCCH for DL grants in format 1A/2B/2C. In total, five sets of SRS parameters can be configured by RRC. One set corresponding to downlink control information (DCI) format 0, one set for each of formats 1A/2B/2C, and three sets for DCI format 4 (as it contains a 2-bit A-SRS triggering field). Unlike periodic SRS, aperiodic SRS only occurs once in response to a trigger. Thus, the aperiodic SRS will not repeat unless the UE receives repeated aperiodic SRS triggers.

SRS is beneficial for coordinated multipoint (CoMP) operations in both the downlink and uplink traffic directions.

Figure 5:
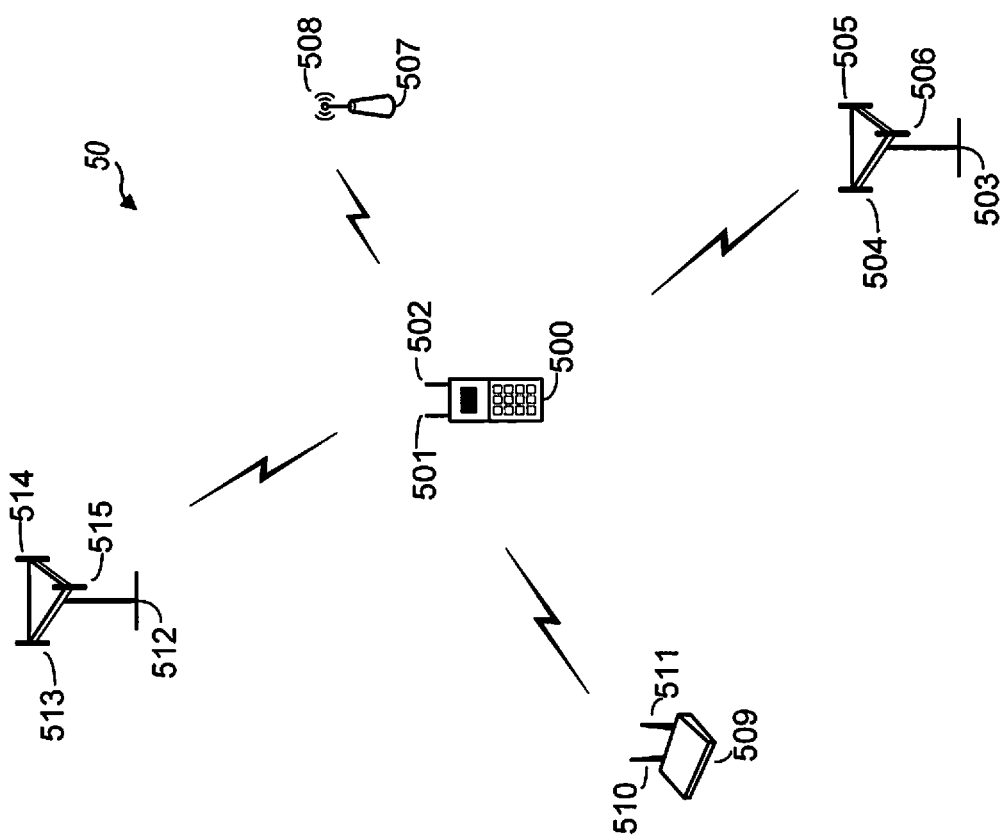
FIG. 5 is a block diagram illustrating a portion of a wireless communications network configured according to one aspect of the present disclosure.

FIG. 5 is a block diagram illustrating a portion of wireless communications network 50 configured according to one aspect of the present disclosure. The illustrated portion of wireless communications network 50 includes UE 500, which is in communication range of macro eNBs 503 and 512, and femto access points 507 and 509. If configured with CoMP capabilities, wireless communications network 50 may provide communication of data to UE 500 using a coordination of signals from macro eNBs 503 and 512 and femto access points 507 and 509. For example, consider that macro eNB 503 receives data that is addressed for delivery to UE 500. Macro eNB 503 communicates with macro eNB 512 and femto access points 507 and 509 to coordinate transmission of the data to UE 500. Macro eNBs 503 and 512 and femto access points 507 and 509 communicate with each other over a backhaul network, such as backhaul communications links 134 and 136 (FIG. 1). Macro eNBs 503 and 512 and femto access points 507 and 509 may then coordinate transmissions of the data to UE 500 using either a coordinated scheduling or coordinated beamforming. For downlink operations, SRS may provide benefit for CoMP set management, channel reciprocity based DL scheduling, and the like. On the uplink side, uplink CoMP provides for reception of the transmitted signal from UE 500 at multiple geographically separated points, such as macro eNBs 503 and 512 and femto access points 507 and 509. Scheduling decisions can be coordinated among macro eNBs 503 and 512 and femto access points 507 and 509 to control interference. For such uplink operations, SRS may provide benefit for rate prediction, power control, uplink CoMP set management, and the like. In a CoMP implementation, UE 500 may be transmitting an SRS to each of macro eNBs 503 and 512 and femto access points 507 and 509.

Currently, SRS power is tied with PUSCH power. A single accumulative loop, f(i), is shared by PUSCH and SRS. However, power offsets may be configured, such as through RRC signaling, in a UE for SRS operation. There may be different offsets for different functions, such as different power offsets for aperiodic and periodic SRS. As CoMP systems are implemented, it is possible to enhance SRS operation such that power control will be able to be enhanced to address different needs for downlink and uplink CoMP operations. For example, open-loop power operations could be defined, such as, two different power offsets one for DL and one for UL, or closed-loop power operations could be defined, such as two accumulative loop, f(i), functions, one for DL and one for UL, or a combination of such open and closed-loop operations. UE-specific cell ID may be configured for SRS as well.

In addition to CoMP systems, since early LTE standards, multiple input multiple output (MIMO) operations are supported. With reference to FIG. 5, MIMO operations provide the use of multiple antennas at both the transmitter and receiver to improve communication performance. For example, as illustrated, macro eNB 503 includes three antennas 504-506, macro eNB 512 includes three antennas 513-515, femto access point 509 includes two antennas 510-511, femto access point 507 includes only a single antenna 508, and UE 500 includes two antennas 501-502. MIMO operation offers significant increases in data throughput and link range without additional bandwidth or increased transmit power. In general, it achieves this goal by spreading the same total transmit power over the antennas to achieve an array gain that improves the spectral efficiency or to achieve a diversity gain that reduces the effect of fading which improves the link reliability. In an example operation, macro eNB 503 may transmit the same data stream to UE over all three antennas 504-506, while UE 500 receives the data streams over antennas 501 and 502. The standards from Rel-8 to Rel-11 support up to eight transmit antennas at the eNB, deployed in one dimension only. This allows space division multiple access (SDMA) or single user (SU)-MIMO in the horizontal direction. In LYE Rel 12 and beyond, higher order MIMO with beamforming based on even more than eight antennas. Two-dimensional (2D) MIMO systems have also been proposed to enhance the peak data rate. Inclusion of antennas in elevation would allow beamforming also in the vertical plane, e.g., allowing the capability to support different floors in a high rise building. In one example implementation of such a system, an example 2D antenna array system with 64 antennas, a grid of 8×8 antennas may be deployed on a 2D plane. In this configuration, horizontal and vertical beamforming are used to exploit beamforming/SDMA gain both in azimuth and elevation.

With multiple antennas supported in UEs of LTE systems, SRS antenna switching has been supported since LTE Rel-8. SRS antenna switching generally serves two distinct purposes: uplink transmission diversity for PUSCH, which may be either open loop or closed loop, and time division duplex (TDD) downlink MIMO beamforming based on channel reciprocity. When transmitting on multiple antennas, the UE is supposed to transmit the same power on each antenna. The SRS transmission power is tied to the PUSCH power control (PC) process. However, the power control requirements are loose, so it is possible for the UE to transmit SRS at different power than it transmits PUSCH by intentionally offsetting SRS power between antennas (at least in the regime of medium to low transmit power). With this ability to offset transmit power, the question arises whether there is a benefit of such offsetting from the system perspective.

In analyzing the potential for such power offset, consider an example in which the UE has two antennas with a certain long term gain imbalance. For purposes of this example, the UE is assumed to have two antennas, though, various numbers of multiple antennas may be provided, and a long term imbalance of 6 dB is assumed, though, various levels of imbalance may occur depending on the antenna implementation. It is also assumed that the antenna gain patterns are close to identical. In one example strategy, the UE will transmit the same power from both antennas for SRS. The imbalance should not have a negative impact because the 6 dB gain imbalance in the uplink channel will correctly reflect the 6 dB gain imbalance also present in the reciprocal downlink channel. However, in another example strategy, the UE will compensate for the gain imbalance by transmitting 6 dB higher power on the weaker antenna. The gain imbalance should not impact the downlink channel considered for precoding when operating in an interference-limited regime. Gain imbalance typically impacts both the signal and interference. Therefore, the receiver is capable of removing the interference by simple scaling. Thus, it should not impact the best downlink precoding.

It should be noted interference conditions may be classified as thermal limited and interference limited. In thermal limited cases, there is minimal interference and thermal noise is dominant. In the interference limited cases, the amount of interference overwhelms the amount of thermal noise.

With both example strategies, of compensation and non-compensation, providing acceptable results, a question arises as to which example strategy to use. In a downlink thermal limited case, performance is typically better when no compensation is provided. In a downlink interference limited case, performance is typically better when compensation is provided. The UE may not know if it is located in a thermal limited or interference limited location. However, the UE does not need to know. The difference that matters and is obtainable by the UE is not whether the UE is located with an interference limited or thermal limited location, but whether the observed interference level is the same in the UE's multiple receiver chains. Various aspects of the present disclosure provide for altering the SRS signals in order to bias the eNB towards a preferred downlink precoding that also considers the observed interference at the UE. In such aspects, the SRS is changed to reflect the imbalance and indicate whether there are variations in interference across the different antennas.

One possible solution for implementing such alteration of an SRS can be described using a covariance of a combined interference and gain imbalance. For example, the combined channel and gain imbalance is represented as a channel matrix H, the covariance of the combined interference and gain imbalance plus thermal noise is represented by N. Using such representations, a good strategy may be if the UE appears towards the eNB as having a channel represented by the following equation:

$$\tilde{H} = N^{-1/2} \cdot H \quad (1)$$

Based on this relationship of Equation (1), the UE may use $N^{-1/2}$ to derive an SRS precoder. This process provides a whitening of the interference and compensation for the gain. It should be noted, however, that use of $N^{-1/2}$ to derive such an SRS precoder may be used by an uplink MIMO UE, but not for an antenna selection capable UE, as an antenna selection UE typically only may use a diagonal matrix as a precoder. In order to apply this strategy for deriving an SRS precoder for an antenna selection capable UE, a diagonal matrix D should be derived, such that the singular value decomposition involving the covariance $$N^{1/2}, svd\left(H' \cdot N^{-\frac{1}{2}} \cdot H\right),$$

is most similar to the singular value decomposition of the diagonal matrix D, $svd(H' \cdot D^2 \cdot H)$, where the definition of most similar considers rank and system performance. Using the singular value decomposition may also be used for determining $N^{-1/2}$ in the MIMO-capable UE cases, but is beneficial when considering to diagonalize the covariance $N^{-1/2}$ as it attempts to separate the mutual correlation between the antennas.

When operating in the uplink direction, SRS precoding or power offsetting are generally not power efficient. The UE will typically boost power of the weaker antenna. Thus, the physical power limitation for the UE may already be close before providing the SRS precoding or power offsetting strategies. Power offsetting is not possible when the UE is at max power due to tight power control requirements.

Additionally, because the number (e.g., 2 or 4) of MIMO SRS may be sent in the same single carrier (SC)-frequency division multiplex (FDM) symbol, but with different cyclic shift offset and/or comb values, the precoding would eliminate the single-carrier property. Moving the SRS transmission to a different symbol could help this inefficiency; however, if PUSCH is scheduled to use the same precoding as SRS and uplink spatial multiplexing is activated, the same problem would exist for PUSCH. These inefficiency issues do not occur with uplink antenna switch capable UEs, but the power inefficiency and power control requirements would still be considered in aspects of the present disclosure operated using such an uplink antenna switching capable UE. Accordingly, the various aspects of the present disclosure should provide for SRS precoding or power offsetting to be done at low power settings.

Figure 6:
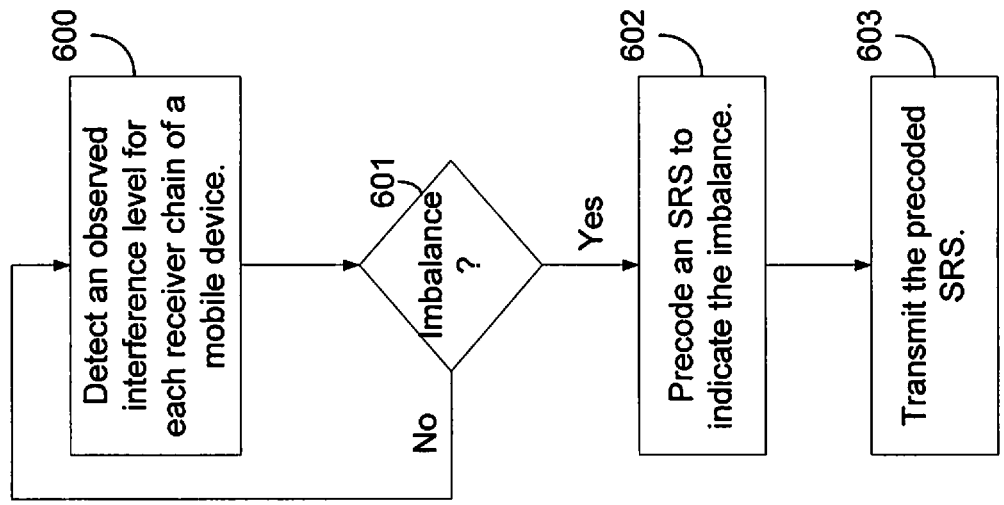
FIG. 6 is a functional block diagram illustrating example blocks executed to implement one aspect of the present disclosure.

FIG. 6 is a functional block diagram illustrating example blocks executed to implement one aspect of the present disclosure. At block 600, a UE detects an observed interference level for each of its receiver chains. For example, with reference to FIG. 5, UE 500 would analyze the observed interference for each receiver chain associated with antennas 501 and 502. FIG. 7 is a block diagram illustrating a UE 120 configured according to one aspect of the present disclosure. In further explanation of block 600, UE 120 includes controller/processor 480 which controls the components and executes the software, firmware, and code logic stored in memory 482 of UE 120 that define the features and functionality of UE 120. Controller/processor 480 executes interference detection operation 700 stored in memory 482. The executing interference detection operation 700 analyzes the interference observed through receiver chains 701-702 coupled to antennas 703. The combination of these components and acts may provide means for detecting an observed interference for each one of a plurality of receiver chains at the UE.

At block 601, a determination is made whether there is an imbalance detected between the receiver chains. If no imbalance is detected, then, the UE continues detecting the observed interference in the receive chains at block 600. Otherwise, if an imbalance is detected, then, at block 602, an SRS is precoded to indicate the imbalance. The SRS may be precoded to target downlink operations of UE 500. With reference to FIG. 5, for example, UE 500 detects observed interference from a channel from macro eNB 512. If UE 500 finds an imbalance in the observed interference from macro eNB 512, then UE 500 will precode an SRS that indicate the detected imbalance. With regard to UE 120 of FIG. 7, the interference detection application 700, executed by controller/processor 480, determines whether there is an imbalance in the observed interference in receiver chains 701-702. If such an imbalance is detected, controller/processor 480 executes SRS generator process 705 to begin generating an SRS message, controller/processor 480 also executes precoder 704, stored in memory 482. Precoder 704 selects a precoding for the SRS generated by SRS generator process 705 that indicates the detected imbalance. The precoding may, in a MIMO-capable UE, utilize the covariance of the combined interference and gain imbalance plus thermal noise estimate, $N^{-1/2}$, to derive an SRS precoder, while a non-MIMO but antenna selection capable UE may use a diagonal matrix corresponding to the, $N^{-1/2}$ covariance to derive an SRS decoder. The combination of these components and acts may provide means for precoding a SRS to indicate an imbalance, in response to detecting an imbalance in the observed interference level for the plurality of receiver chains.

At block 603, the UE transmits the SRS. With reference to FIG. 5, UE 500 would transmit the SRS to macro eNB 512. With regard to UE 120 of FIG. 7, controller/processor 480 controls transmit processor 464 to compile the SRS signal generated by SRS generator process 705 with the precoding established by precoder 704. The SRS signal is then transmitted, under control of controller/processor 480 and transmit processor 464 through transmitter chains 706-707 and antennas 703. The combination of these components and acts may provide means for transmitting the preceded SRS.

In alternative aspects of the present disclosure, preceding of the SRS may also include an indication to compensate a transmit power for one or more imbalanced receiver chains. For example, with regard to FIG. 7, controller/processor 480, when executing interference detection application 700, also executes power detection application 708 which uses a detected interference or detected gain imbalance to determine whether a power compensation of one or more of the imbalanced receiver chains would be desirable. The result of the execution of power detection application 708, when such a compensation would be useful, provides an indication with the precoded SRS of a useful transmit power compensation. If the UE receives such a power compensation in response to the indication transmitted in the preceded SRS, power controller 109, under control of controller/processor 480, would adjust the transmit power of one of receiver chains 701-702.

For an uplink MIMO capable UE, there are generally two SRS processes. The first SRS process targets uplink operations and is the same as provided in Rel-10. The second SRS process targets the downlink operations and uses the covariance of the combined interference and gain imbalance plus thermal noise estimate, $N^{-1/2}$, to derive an SRS precoder. For a non-MIMO but antenna selection capable UE, the UE could apply a diagonal matrix, such as a power offset, to derive the SRS precoder. For the non-MIMO but antenna selection capable UE, the UE may also signal a desired power offset between the antennas without applying it. Any power offset actually applied, should be limited when the UE approaches maximum power. Additionally, the preceding may be turned off when the UE approaches maximum power.

It should be further noted that, when available, the two SRS processes use separate (virtual) antenna ports. However, if there is no separate SRS port available, the SRS precoder should also be applied to the PUSCH. In order to mitigate peak to average power ratio (PAPR) increase, it may also be beneficial to use separate symbols for the different antenna ports for the second SRS process.

When operating aspects of the present disclosure in a network implementing a CoMP system, there may be multiple second SRS processes, each mapped to different channel state indicator (CSI)-RS plus interference management resource (IMR) combination. This combination may be signaled to the UE.

In an additional aspect of the present disclosure, SRS precoding may be explicitly signaled by eNB to the UE. The precoded SRS may be configured in several different ways, such as on a per UE basis, enabled for either one or both of frequency division duplex (FDD) or time division duplex (TDD) systems, or applied only with aperiodic SRS transmissions. Although it is possible to enable it also for periodic SRS transmissions, it is more difficult to indicate the preferred precoding vector for a given periodic SRS transmission.

Figure 9:
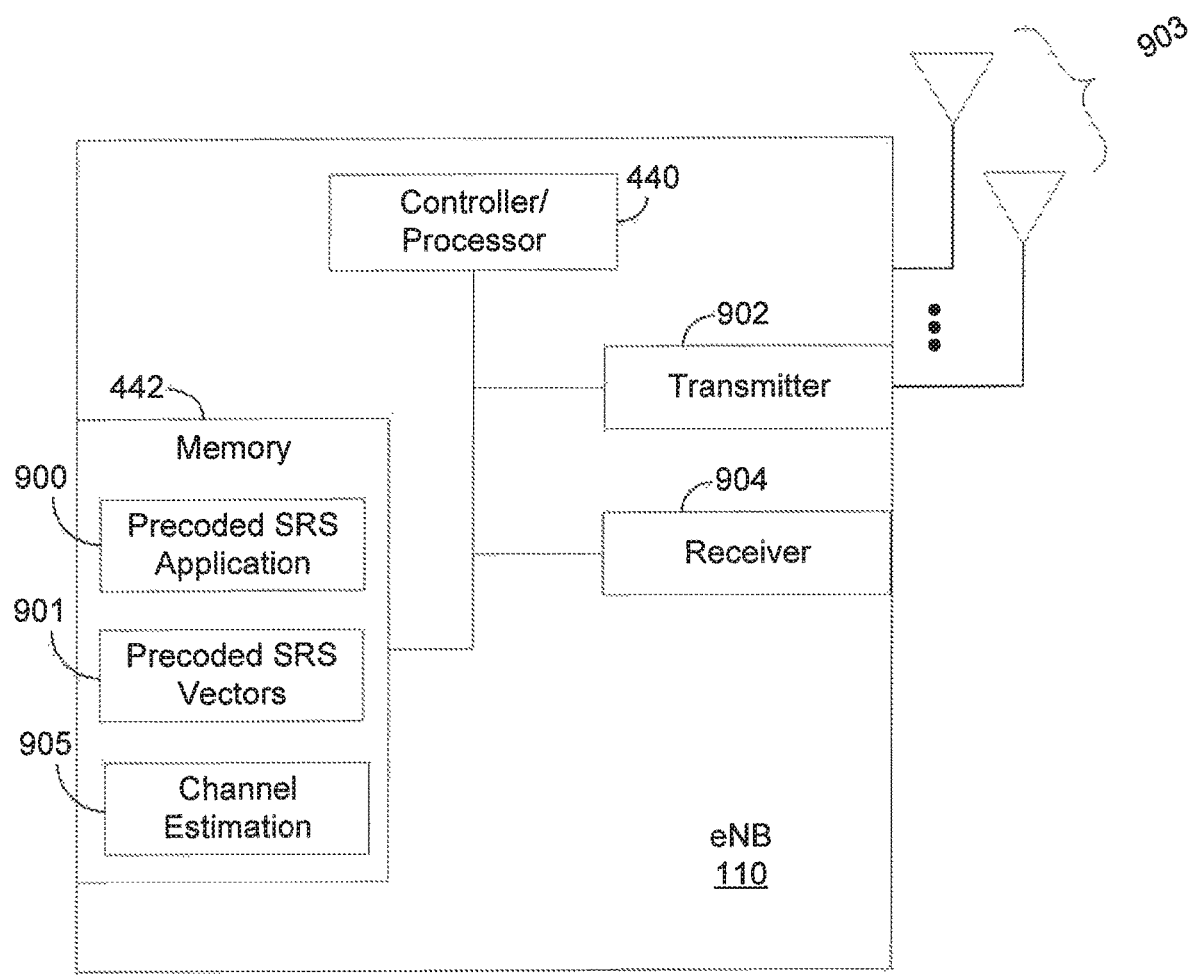
FIG. 9 is a block diagram illustrating an eNB configured according to one aspect of the present disclosure.

FIG. 8 is a functional block diagram illustrating example blocks executed to implement one aspect of the present disclosure. At block 800, an eNB determines a precoded SRS vector for one or more served UEs. The SRS vector may be precoded target downlink operations. FIG. 9 is a block diagram illustrating an eNB 110 configured according to one aspect of the present disclosure. In an example of block 800, eNB 110 includes a controller/processor 440 and a memory 442 coupled to controller/processor 440. Controller/processor 440 controls the components and executes the software, firmware, and other code logic stored in memory 442 to define the features and functionality of eNB 110. At block 800, controller/processor 440 executes precoded SRS application 900, stored in memory 442. Executing precoded SRS application 900 will determine the precoded SRS vector selecting from the possible vectors stored at precoded SRS vectors 901. The precoded SRS vector will be selected either on a per UE basis, enabled for either one or both of FDD or TDD systems, or preferably applied with aperiodic SRS transmissions. The combination of these components and acts provides means for determining a precoded SRS vector for one or more served UEs, wherein the determined precoded SRS vector includes determining the precoded SRS vector on a per UE basis, enabling the precoded SRS vector for either one or both of FDD and TDD systems.

Various alternatives of indicating the precoding vector for SRS may be used. For example, in one aspect, the radio resource control (RRC) is configured to select one precoding vector. While this provides for a simple process, a single SRS vector may not provide the potential benefits of this disclosure. With reference to FIG. 9, precoded SRS vectors 901, in memory 442, would therefore contain only a single precoded SRS vector.

In another aspect of the present disclosure, the RRC may configure multiple precoding vectors, one per aperiodic SRS set, and dynamically and explicitly indicate which one to use. The precoding vector may be included in each of the five sets of SRS parameters. That is one set of SRS parameters tied with a particular DCI format. For example, in set 1, tied with DCI format 0, precoding vector 1 may be assigned, in set 2 to set 4, tied with DCI format 4, precoding vectors 2 to 4 may be assigned, and set 5, tied with DCI format 1A/2B/2C, precoding vector 5 may be assigned. With reference to FIG. 5, upon detection of a DCI format, and if aperiodic SRS is triggered, macro eNB 512 uses the precoding vector defined in the corresponding set for precoded SRS vector transmitted to UE 500.

Since aperiodic SRS for a UE is transmitted in a set of UE-specific aperiodic SRS subframes, for a given A-SRS transmission in a subframe, a UE may receive two or more triggers. Enforcement policies may be set in place such that UE 500 (FIG. 5) can enforce the policy for the A-SRS subframe in which the multiple triggers are received. For example, UE 500 may enforce the same precoding vector when the two or more triggers have to trigger the same precoding vector. Otherwise, if the two or more triggers would trigger separate precoding vector, an error event is noted. Alternatively, the enforcement policy may take the precoding vector associated with the latest trigger, subject to misalignment between eNB and UE regarding which precoding vector the UE is using for a precoded SRS transmission.

In an additional aspect of the present disclosure, an RRC may configure multiple sets, and dynamically/implicitly indicate which one to use. For example, the precoding vector in use may be tied with a subframe index. This solution is more restrictive, since eNB often has difficulty in actual controlling of which precoding vector to be used. In an additional example of an implicit indication of the precoding vector to use, the eNB may select the precoding vector based on the aggregation level, the decoding candidate(s), search space, PDCCH type (legacy PDCCH or enhanced PDCCH (EPDCCH)), the resource sets associated with EPDCCH, and the like. In a further example of an implicit indication, the eNB may implicitly select the precoding vector based on different scrambling (e.g., using different radio network temporary identifiers (RNTIs), similar to uplink antenna switching) of cyclic redundancy check (CRC). In a still further example, the eNB may select the precoding vector based on a new information field or by re-interpreting or re-tasking some existing information field(s) in DCI to indicate the precoding vector. In select additional aspects, a DCI may be provided for both downlink grants and uplink grants. For example, a 2-bit field to indicate one from four possible precoding vectors (which can be RRC configured, or specified in the specification). The entire DCI may be dedicated to A-SRS triggering (without any associated DL-SCH and UL-SCH) or standalone A-SRS triggering, wherein the precoding vector can be explicitly indicated. In a further example, the selection of the precoding vector by the eNB may be tied with the precoding used for PUSCH. For example, the latest PUSCH with rank 1 precoding for limited usage. In addition to these alternative aspects, another aspect may involve various combinations of these alternative.

The A-SRS process(es) with precoding enabled can be based on the process defined, for CoMP or separately defined. In a first alternative, two A-SRS processes can be defined for a UE, where the first process is the original Rel-10 A-SRS process and the second process is modified A-SRS process for CoMP operation and the precoding vector is further added (e.g, as part of RRC configuration) to be associated with the second process. As a second alternative, three A-SRS processes can be configured for a UE. Besides the original Rel-10 A-SRS process and a A-SRS process dedicated for CoMP, a new A-SRS process can be introduced, wherein the precoding vector may be further added (e.g, as part of RRC configuration) to be associated with the new process. The new A-SRS process targeting improved DL MIMO operation, where A-SRS is precoded. In a particular A-SRS subframe, which process is being used is either explicitly or implicitly derived. For example, each process is associated with a set of A-SRS subframes, and these set of A-SRS subframes may not overlap (if overlapped, some prioritization is performed to allow one process to transmit while other process(es) are dropped, if parallel A-SRS transmission in a subframe is not allowed).

To determine an appropriate A-SRS precoding vector, eNB can rely on the original multi-port periodic SRS process and/or the original multi-port aperiodic SRS process.

In interactions with PUSCH, if in a same subframe on the same carrier, precoded A-SRS are transmitted simultaneously with PUSCH (especially rank 1 PUSCH transmissions), the precoding of A-SRS may be aligned with that for PUSCH. Alternatively, it can be up to eNB to ensure that the same precoding is indicated to PUSCH and SRS transmitted in the same subframe. Different precoding vectors for PUSCH and SRS in the same subframe are allowed if the eNB determines that it's necessary and indicates so.

In some cases, it may be beneficial to increase SRS density to improve channel estimation for channel reciprocity based DL MIMO operations. FIG. 10 is a functional block diagram illustrating example blocks executed to implement one aspect of the present disclosure. At block 1000, a mobile device determines a density of SRS transmissions. For example, a channel and/or interference condition may occur where the number of antennas at the eNB is very large (e.g., 64). Current SRS transmission may be inefficient and/or may not achieve desirable accuracy. Thus, another channel and/or interference condition may be determined by the mobile device when it detects a lower than expected accuracy in downlink transmissions. In operation, with reference to FIG. 7, the execution of channel and/or interference detection logic 700, stored in memory 482, by controller/processor 480 creates and operating environment, such that signals received through antennas 703 and receiver chains 701-702 are analyzed to detect the channel and/or interference condition, such as the low accuracy. Alternatively, information received in system information signals from a serving base station may identify the number of antennas operating at the base station. The operating environment of channel and/or interference detection logic 700 will determine a channel and/or interference condition when the number of antennas operating at the base station exceeds a certain amount. When the channel and/or interference condition is detected through the execution environment of channel and/or interference detection logic 700, controller/processor 480 executes SRS generator 705 to increase the density of SRS transmissions. The combination of these acts and components may provide means for determining, at a mobile device, a density of SRS transmissions.

At block 1001, the mobile device increases the density of its SRS transmissions in response to the channel and/or interference condition. For example, UE 120, under control of controller processor 480 sends the SRS transmissions through transmit processor 454, transmission chains 706-707, and antennas 703. The combination of these acts and components may provide means for transmitting SRS by the mobile device based at least in part on the determined density.

SRS density can be increased either by: (1) increasing the density of SRS transmissions within a subframe; or (2) increasing the density of SRS transmissions over multiple subframes (SRS bundling). Currently, SRS is only the last symbol of subframe. SRS transmission may be extended into other symbols while minimizing standard impact, e.g., putting in the last symbol of the first slot, or the first symbol of the first slot. The shortened PUCCH format currently defined for the second slot can also be enabled in the first slot. When increasing SRS density across subframes a single SRS may be repeated over multiple subframes using a same location and/or same number of antenna ports, and the like, or a single SRS may be transmitted over multiple subframes, in which each transmission consists of part of the SRS. As an example, a 4-port SRS can be transmitted in four subframes, each with one SRS port. The set of subframes for bundled SRS transmissions can be consecutive or non-consecutive, and can still belong to the set of cell-specific SRS subframes. Currently, the smallest UE specific SRS periodicity is 2 ms. The periodicity can be extended to include 1 ms. A combination thereof is also possible. The number of bundled SRS subframes for a SRS transmission can be configurable or be predetermined (e.g., fixed at 4 subframes). The number of bundled SRS frames can also be linked with TTI bundling operation for PUSCH.

FIG. 11 is a functional block diagram illustrating example blocks executed to implement one aspect of the present disclosure. When a mobile device increases the density of its SRS transmissions, the serving base station may improve its channel estimation for reciprocity-based downlink MIMO operations. At block 1100, the serving base station determines a density of SRS transmissions for the mobile device. For example, a channel and/or interference condition may occur where the number of antennas at the eNB is very large (e.g., 64). Current SRS transmission may be inefficient and/or may not achieve desirable accuracy. For example, with reference to FIG. 9, eNB 110, under control of controller/processor 440 determines the number of antennas 903 is over a threshold number or executes channel estimation logic 905 in memory 442 to determine that the current SRS transmissions are inefficient. Based on these various factors, controller/processor 440 determines a density for SRS transmissions by a particular UE. The combination of these acts and components may provide means for determining, at a base station, a density of SRS transmissions for a UE served by the base station.

At block 1101, the base station indicates the density of SRS to the UE. For example, eNB 110, under control or controller/processor 440, sends a control signal to the UE via transmitter 902 and antennas 903 that identifies the density of SRS. The combination of these acts and components may provide means for indicating the density of SRS to the UE.

At block 1102, the base station receives the SRS transmissions from the UE. For example, eNB 110 receives signals over antennas 903 and receiver 904 which, under control of controller/processor 440, are decoded and determined to be SRS transmissions. The SRS transmissions will be received according to the density that eNB 110 indicated to the UE. The combination of these acts and components may provide means for receiving, at the base station, the SRS transmissions from the UE.

DM-RS Density Increase. Similarly, DM-RS density in UL can also be increased. DM-RS can be used for PUKE demodulation or sounding purpose. When DM-RS is used for sounding purpose, the cyclic shift for sounding can be different from the one for PUSCH demodulation. If subframe (TTI) bundling is enabled for DM-RS for sounding, the number of subframes for DM-RS transmissions can be configurable or pre-determined. Note that the subframes are not necessarily to be cell-specific SRS subframes. The bundling size can be linked with the size for PUSCH TTI bundling Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The functional blocks and modules in FIGS. 6 and 7 may comprise processors, electronics devices, hardware devices, electronics components, logical circuits, memories, software codes, firmware codes, etc., or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication, comprising:
   determining, by a base station, a precoded sounding reference signal (SRS) vector for one or more user equipments (UEs), wherein determining the precoded SRS vector comprises one of:

enabling the precoded SRS vector for at least one of: a frequency division duplex (FDD) system or a time division duplex (TDD) system; or enabling the precoded SRS vector for aperiodic SRS only;

transmitting the determined precoded SRS vector from the base station to at least one UE of the one or more UEs; and receiving, at the base station from the at least one UE, a precoded SRS indicating an imbalance between a plurality of receiver chains of the at least one UE.

2. The method of claim 1, wherein the precoded SRS vector targets downlink operations.

3. The method of claim 1, wherein:
determining the precoded SRS vector comprises determining, by the base station, a single precoded SRS vector; and
the imbalance comprises a detected imbalance based on an observed interference level for each one of the plurality of receiver chains.

4. The method of claim 1, further comprising:
dynamically determining, by the base station, a plurality of precoded SRS vectors, the plurality of precoded SRS vectors comprising the precoded SRS vector.

5. The method of claim 4, wherein further comprising:
assigning, by the base station, each precoded SRS vector of the plurality of precoded SRS vectors to an aperiodic SRS set of a plurality of aperiodic SRS sets.

6. The method of claim 5, further comprising:
determining a downlink control information (DCI) format; and
transmitting from the base station to the UE the precoded SRS vector assigned to the one of the plurality of aperiodic SRS sets corresponding to the determined DCI format.

7. The method of claim 1, wherein the precoded SRS vector is implicitly selected for use based on one of:
a subframe index;
an aggregation level; or
a decoding candidate.

8. The method of claim 1, wherein the precoded SRS vector is selectable for use based on information included in a downlink control information (DCI) message.

9. The method of claim 1, wherein precoded SRS vector is selected for use according to a precoding used for a physical uplink shared channel (PUSCH).

10. The method of claim 1, wherein the determined precoded SRS vector instructs transmission of a precoded SRS over a plurality of subframes.

11. The method of claim 10, wherein the determined precoded SRS vector instructs the precoded SRS to be transmitted using the same transmission parameters for each of the plurality of subframes.

12. The method of claim 10, wherein the plurality of subframes are configurable.

13. The method of claim 10, wherein the precoded SRS comprises demodulation reference signals (DM-RS) used for sounding.

14. The method of claim 1, wherein determining the precoded SRS vector includes enabling the precoded SRS vector for the FDD system.

15. The method of claim 1, wherein determining the precoded SRS vector includes enabling the precoded SRS vector for the TDD system.

16. The method of claim 1, wherein determining the precoded SRS vector includes enabling the precoded SRS vector for aperiodic SRS only.

17. A wireless communication apparatus, comprising:
means for determining, by the wireless communication apparatus, a precoded sounding reference signal (SRS) vector for one or more user equipments (UEs), wherein the means for determining the precoded SRS vector includes one of:
means for enabling the precoded SRS vector for at least one of: a frequency division duplex (FDD) system or a time division duplex (TDD) system; or
means for enabling the precoded SRS vector for aperiodic SRS only; and
means for transmitting the determined precoded SRS vector from the wireless communication apparatus to at least one of the one or more UEs; and
means for receiving, from the at least one UE, a precoded SRS indicating an imbalance between a plurality of receiver chains of the at least one UE.

18. The wireless communication apparatus of claim 17, wherein:
the precoded SRS vector targets downlink operations; and
the precoded SRS is precoded based on the precoded SRS vector and comprises an indication to compensate a transmit power for one or more imbalanced receiver chains of the plurality of receiver chains.

19. The wireless communication apparatus of claim 17, further comprising:
means for transmitting, to the at least one UE in response to receiving the precoded SRS, a control signal indicating a power compensation to apply to one or more imbalanced receiver chains of the plurality of receiver chains.

20. The wireless communication apparatus of claim 17, further comprising:
means for transmitting, to the at least one UE, a plurality of aperiodic SRS triggers.

21. The wireless communication apparatus of claim 20, wherein where the aperiodic SRS triggers are for triggering transmission of the precoded SRS and are transmitted with the precoded SRS vectors.

22. The wireless communication apparatus of claim 21, further comprising:
means for determining a downlink control information (DCI) format; and
means for transmitting from the wireless communication apparatus to the UE the precoded SRS vector assigned to the one of the plurality of aperiodic SRS set corresponding to the determined DCI format.

23. A non-transitory computer-readable medium comprising code that, when enacted by one or more computer processors, causes the one or more computer processors to:
determine, by a base station, a precoded sounding reference signal (SRS) vector for one or more user equipments (UEs);
transmit the determined precoded SRS vector and a plurality of aperiodic SRS triggers from the base station to at least one of the one or more UEs, the aperiodic SRS triggers configured to trigger transmission of the precoded SRS; and
receive, at the base station from the at least one UE, a precoded SRS indicating an imbalance between a plurality of receiver chains of the at least one UE, the imbalance detected by the U based on an observed interference level for each one of the plurality of receiver chains.

* * * * *